United States Patent [19]
Brocker

[11] 3,976,876
[45] Aug. 24, 1976

[54] SIGNAL CONTROL APPARATUS

[76] Inventor: Dale C. Brocker, 19525 Forest Ave., Castro Valley, Calif. 94546

[22] Filed: June 3, 1974

[21] Appl. No.: 475,660

Related U.S. Application Data

[62] Division of Ser. No. 264,077, June 19, 1972, Pat. No. 3,818,369.

[52] U.S. Cl. ................................ 250/227; 250/234
[51] Int. Cl.² ........................................... G02B 5/14
[58] Field of Search .......... 250/227, 234, 221, 239; 350/96 R, 96 B

[56] References Cited
UNITED STATES PATENTS 3,336,482 8/1967 Mierendorf et al. ................ 250/229
3,444,385 5/1969 Paglee ................................. 250/227
3,624,404 11/1971 Hines ............................... 250/231 P
3,758,785 9/1973 Maute ............................... 250/229
3,767,022 10/1973 Olson ................................ 250/229

OTHER PUBLICATIONS

Sharp et al., IBM Technical Disclosure Bulletin, vol. 5, No. 10, Mar., 1963, p. 127.

*Primary Examiner*—Walter Stolwein
*Attorney, Agent, or Firm*—Paul B. Fihe

[57] ABSTRACT

Signal control apparatus which includes a control element in the form of a short section of fiber optic material which can be displaced by depression of a flexible plate or push button into alignment with adjoining sections of fiber optic material.

3 Claims, 4 Drawing Figures

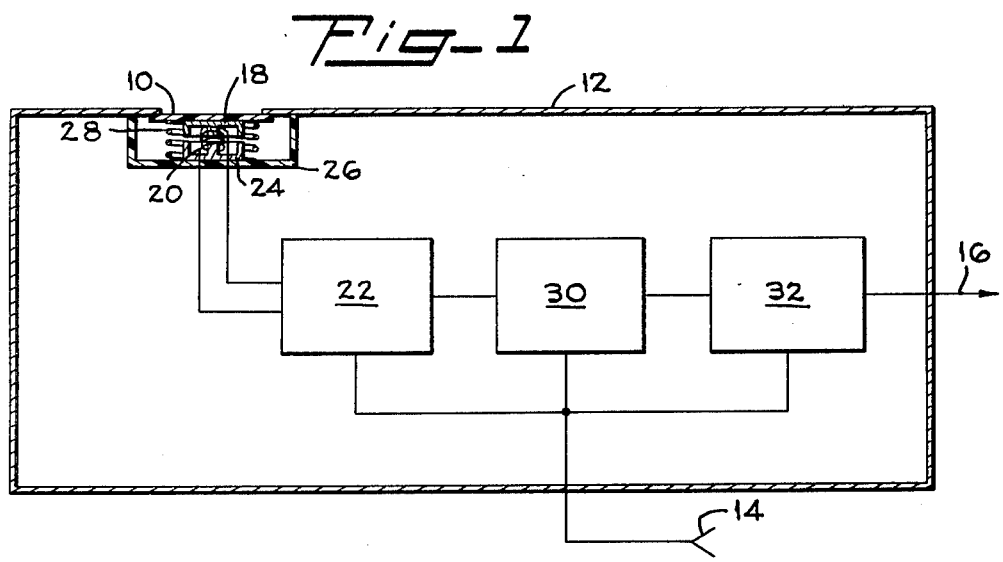
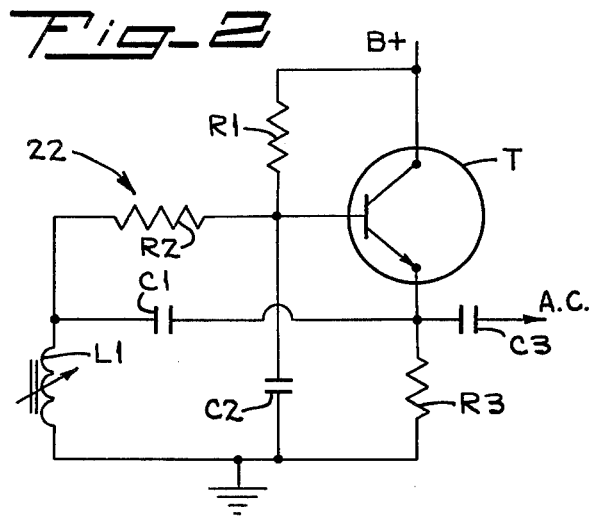
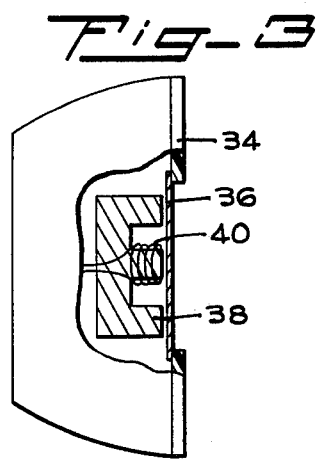
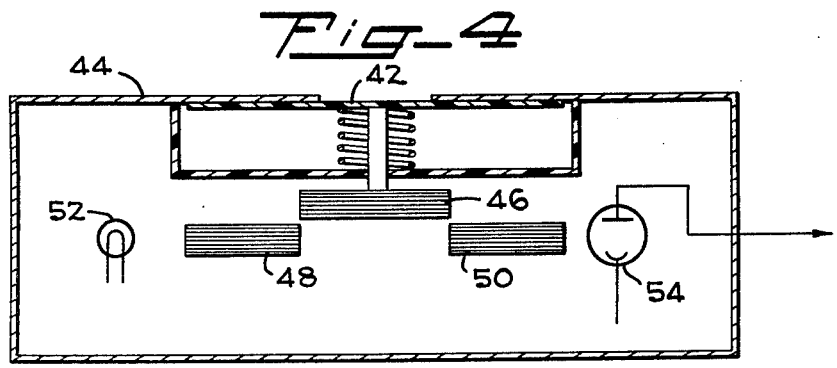

SIGNAL CONTROL APPARATUS

This is a division of application Ser. No. 264,077 filed on June 19, 1972.

FIELD OF THE INVENTION

The present invention relates to control mechanisms and more particularly to a signal control apparatus which controls signals on a qualitative (e.g. off and on) or quantitative (e.g. frequency) basis.

BACKGROUND OF THE INVENTION

The normal wall-mounted switch used, qualitatively, to control the application of electrical power to an electric light or other load in a residence is, of course, quite effective over relatively extended periods under normal environmental conditions. However, this type of switch involves the mechanical motion of metal contacts into or out of physical contact and limitations on its useful life even under normal environmental conditions are found. More particularly, even though relatively small amounts of power must be delivered, the spacing of the contacts must be maintained at a minimum amount to preclude inadvertent arcing, for example, when high local humidity reduces the effective resistance between the separated contacts. Accordingly, considerable motion is required to provide a useful switch and this, in turn, limits the useful life typically to approximately 100,000 opening and closing operations. If the humidity is quite high or other environmental conditions, such as operation in a submarine or the like where more moisture exists, are encountered the useful life is much more limited because of chemical action and the arcing experienced as the switch contacts approach their closure position.

To overcome these defects, attempts have been made to avoid the necessity for direct mechanical contact of two conductors, a known example being the capacitively-operated switches found quite commonly on elevators and the like, but these too are adversely affected by a change in humidity or other environmental conditions which affect the dielectric of the capacitor. While certain problems of the simple mechanical switch are eliminated, these additional problems have created, in certain instances, serious malfunctions.

While, as indicated hereinabove, malfunctions in existing switches or other devices which provide a qualitative signal control are significant, yet more critical significance in quantitative control functions are experienced with existing control mechanisms. For example, in the case of some electronic organs using certain types of oscillator circuits, a change in humidity "detunes" the oscillators and expensive measures have been taken to avoid this problem of inadvertent frequency variation.

SUMMARY OF THE PRESENT INVENTION

Accordingly, it is the general objective of the present invention to provide signal control apparatus enabling effective and precise signal control under all environmental conditions and for extended periods of time.

Generally, this objective is achieved by utilizing a control element mounted for motion in association with a signal source to provide either qualitative or quantitative variation in the output signal. An actuating member is connected to the control element and, in response to externally-applied mechanical force, is arranged to move the same.

In the qualitative case, motion of the control element provides a switching function from an "off" position whereat no output signal is developed to an "on" position wherein an output signal of predetermined amplitude is delivered. More particularly, this embodiment of the invention includes a control switching element requiring but a minimal amount of motion to connect an electrical load to a suitable electrical power source. Since the motion required is minimal, it can be manually actuated by a push button whose central portion can be depressed but whose perimeter is permanently connected in sealed relation to a housing within which the switch element is supported, thus to be removed from exterior environmental effects. Conveniently, the push button can be in the form of a thin flexible sheet or plate of polycarbonate plastic material which is not only flexible to a limited degree but is also resilient so as to return to its inoperative position over an extended period of time and regardless of environmental changes in temperature, humidity or the like. One specific example is the polycarbonate plastic sold under the trade name "LEXAN". If such material be used, it may be in the form of a circular sheet or plate having an exposed surface of approximately one inch and a thickness of 0.060 inch.

In this embodiment of the invention, the mentioned control element can take the form of an inductor with a split core, one section of which is connected to the flexible plate or push button so that depression thereof by simple manual pressure effects a substantial change in the magnetic flux path of the inductor and effects such change with no more than 0.005 inch of motion. With common commercially available split-core inductors, such slight motion can effect a substantial change of inductance in a ratio of approximately one to ten. Such substantial inductive variation response to small mechanical motion can be utilized to control a suitable electrical circuit which preferably takes the form of a novel oscillator having such inductor in series connection with a capacitor so that oscillation is established only upon a predetermined increase in inductance resultant from depression of the push button. Such oscillator can be quite simple utilizing a transistor and other components which can be encapsulated in plastic so as to be free from exterior environmental effects. When the inductance does change so that the oscillator is rendered active, in effect, the circuit is turned from its "off" to its "on" position.

In practice, depending upon the power capabilities of the particular transistor, the alternating circuit output of the oscillator can be used as the source of power or as an alternative, it may be fed to a suitable rectifier to provide a DC control voltage. If yet greater powers are necessitated, the AC or DC signal can, of course, be used in a conventional fashion to control a relay for ultimate connection of the required source of power to the electrical load.

It will be apparent that after the inductance value has increased to the level whereat oscillation occurs, yet further increase in inductance will merely change the resonant frequency, and accordingly, by proper choice of circuit components, a variable frequency oscillator responsive to motion applied by external forces can be provided, thus forming a quantitative device. The motion responsive arrangement accordingly can be used as a motion or pressure sensor and also as a microphone or acousto-electric transducer wherein sound waves vary the frequency of oscillation to provide a frequency modulation system or through use of a conjoined rectifier, an amplitude modulation arrangement. The control element can be a very light weight element so as to have an excellent response to all audio frequencies.

As a distinct alternative to the oscillator arrangements, the control element can take the form of a short section of commercially available fibre optic material having a diameter of approximately 0.0012 inch which can be displaced by depression of the flexible plate or push button into alignment with adjoining sections of fibre optic material, one end of which is exposed to a simple source of light and the other to a photocell so that upon depression of the push button, a completed light circuit is established which, in turn provides, through normal operation of the photocell, an electrical signal which may be used directly or through a relay to provide application of power to the electrical load.

BRIEF DESCRIPTION OF THE DRAWINGS

The stated objective of the invention and the manner in which it is achieved, as summarized hereinabove, will be more readily understood by reference to the following detailed description of the exemplary embodiments of the invention shown in the accompanying drawing wherein:

FIG. 1 is a diagrammatic view of a signal control apparatus embodying the invention, the electrical elements of which are shown partially in block diagram form, FIG. 2 is a schematic diagram of an oscillator constituting one component of the FIG. 1 arrangement, FIG. 3 is a side elevational view of a microphone, with portions broken away, constituting a modified embodiment of the invention, and FIG. 4 is another modified embodiment of the invention shown in diagrammatic form utilizing light transmission as the control mechanism.

DETAILED DESCRIPTION OF EXEMPLARY EMBODIMENTS OF THE INVENTION

With initial reference to FIG. 1, a push button 10 in the form of a thin, circular resilient plate of "LEXAN" which is approximately 0.06 inch thick and has an exposed surface approximately one inch in diameter is secured by a suitable sealant adhesive at its peripheral edge to a metal housing 12 which forms an entire hermetically-sealed enclosure with suitable exterior connections to an input source of power as indicated at 14, and an output signal to the electrical load, as indicated at 16.

To the undersurface of the push button 10 and approximately centrally thereof is secured one section 18 of a split core inductor having a generally cup-shaped cylindrical configuration and in encompassing relationship with an inductive coil 20 whose leads are connected to a novel oscillator 22, which will be described hereinafter. An additional matching core section 24 is aligned with the movable core section connected to the push button and is rigidly supported from a rigid bracket 26 secured to the housing 12. While the push button 10 will normally assume its illustrated inoperative disposition, because of its resilient nature, if desired, an additional coil spring 28 can be arranged in surrounding relationship to the coil 20 and core member sections 18, 24 to retain the push button in its illustrated disposition whereat the ends of the two cup-shaped core member sections are in slightly spaced relationship which preferably approximates 0.005 inch. It will therefore be obvious that when the central portion of the resilient push button 10 is depressed by finger pressure, the core member sections 18, 24 will be quickly brought into substantially abutting relationship thus to effect a substantial variation in the inductance of the inductive unit. Typically the inductance will increase tenfold by such limited motion of but 0.005 inch. The strength of the surrounding coil spring 28 can be chosen so that inadvertent motion thereof, for example, as a result of a change in barometric pressure will be insufficient to effect substantial motion of the inductive core member section 18.

Electrically, the variable inductance coil 20 described hereinabove is connected as the critical control element in the mentioned oscillator 22 which preferably is in the form of a novel oscillator circuit as shown in FIG. 2 wherein the inductor denominated $L_1$ is in series resonant circuit relationship with a capacitor $C_1$ connected to the emitter of an npn transistor T which, for example, may be the commercially available transistor 2N2222 capable of providing a 5 milliampere output. The transistor T is basically connected as an emitter follower with its collector connected to a suitable source of D.C. potential denominated B+ and its emitter connected through an output resistor $R_3$ of predetermined value to ground. In turn, the transistor base is connected to the source B+ through a high value resistor $R_1$ and through a relatively low value resistor $R_2$ to the inductor $L_1$ which is grounded thus to provide a base D.C. connection to ground. A capacitor $C_2$ is also connected between the transistor base and ground thus forming an RC circuit in parallel with the controlling inductor $L_1$.

The voltage source and circuit values are chosen so that a relatively small D.C. current flows through the emitter follower resistor $R_3$ prior to depression of the push button 10. Since the output impedance is indirectly proportional to the emitter current, it is high and since the resistor $R_3$ is connected in parallel with the series $L_1C_1$ circuit, the Q of such circuit is relatively low. Therefore the known voltage gain of a series resonant circuit is not realized and since the values are chosen so that a gain of less than one is realized, the circuit can not oscillate.

However, when the push button 10 is depressed, the inductance $L_1$ increases rapidly, thus to lower the resonant frequency of the $L_1$ $C_1$ circuit. The decrease in frequency in turn reduces the attenuation in parallel $R_2C_2$ circuit and the effective Q of the $L_1$ $C_1$ circuit accordingly increases enabling the circuit to oscillate. An A.C. output is accordingly developed across the resistor $R_3$. As shown, the A.C. output of the oscillator 22 is connected through a capacitor $C_3$ to a rectifier 30 which in turn delivers its D.C. output to a relay 32, and in turn, delivers the output signal 16 to the electrical load whatever its nature may be. Obviously, for certain applications the relay 32 may be eliminated and for others the A.C. output of the oscillator 22 will be sufficient to provide the necessary power controlling output signals.

Obviously, if depression of the push button 10 requires production of an output signal for a predetermined time, the mentioned relay 32 can be in the form of a conventional holding relay with the required time factor incorporated therein, or other auxiliary components can be used dependent upon the particular application.

If the described npn transistor T (2N2222) is utilized with a B+ voltage of 5 volts to provide an output of approximately 5 milliamperes, the component values of the described circuit may be substantially as follows:

| | | |
|---|---|---|
| $R_1$ | 0.1 | megohm |
| $R_2$ | 47 | kilohms |
| $R_3$ | 1 | kilohm |
| $C_1$ | 0.001 | microfarads |
| $C_2$ | 100 | picofarads |
| $L_1$ range | 60 MH – 3 MH | |

It will be apparent that both mechanical and electrical variations in the described first embodiment of the invention can be made without departing from the spirit of the invention. For example, a simple mechanical change will enable the core sections 18, 24 to separate rather than approach one another in response to motion of the push button 10. Furthermore, since it is clear that after the push button 10 has been depressed sufficiently to establish oscillation, further depression thereof will continue to increase the inductance $L_1$, thus to provide a variation in inductance and resonant frequency that is proportional to the amount of motion, wherefore a quantitative signal control is provided.

Accordingly, the described arrangement, with proper choice of circuit values, can function as a motion or pressure sensor, providing an electrical analogue of the mechanical quantity.

Extending this concept, the arrangement can function as an acoustic-electric transducer which may take the form of a microphone as shown in FIG. 2. A plastic housing 34 supports a thin (1 mil) diaphragm 36 of a steel alloy adjacent a core member 38 that surrounds a coil 40 that is electrically connected in a circuit such as shown in FIG. 2 as the variable inductance $L_1$. The circuit components are selected to provide oscillation at a frequency $F_1$ which is frequency modulated in response to sound frequencies impinging on the diaphragm 36. Thus, frequency modulation is provided. If amplitude modulation is desired, additional circuitry can be utilized to make the conversion.

It is to be particularly observed that the diaphragm 36 can be small and of light weight so as to have excellent response to the impinging sound waves.

As another embodiment of the invention, reference is now made to FIG. 4 wherein a push button 42 of the same nature as that described in connection with the first embodiment of the invention is again similarly connected in hermetically-sealed relationship to a sealed housing 44 and mounts a short section 46 of a fibre optic material having a diameter of 0.0012 inch which is arranged upon depression of the push button to move into alignment with two adjoining sections 48, 50 of the same fibre optic material so as to then provide a continuous light conductor between a suitable light source 52 diagrammatically indicated at the left of FIG. 4 and a suitable photoelectric cell 54 indicated at the right end thereof. The output of the photoelectric cell 54 in turn then provides the output signal for control of power and obviously additional relays or other electronic instrumentalities can be utilized as a supplement if necessary for a particular application.

Obviously, various other modifications and alterations can be made in the described embodiments of the invention without departing from the spirit thereof and the foregoing description of but three embodiments is accordingly to be considered as purely exemplary and not in a limiting sense. In particular the arrangement can provide a control mechanism between either human or process inputs and an analogue output. Accordingly, the actual scope of the invention is to be indicated only by reference to the appended claims.

What is claimed is:
1. Signal control apparatus which comprises
   a light source,
   two spaced but aligned fixed fibre-optic sections arranged to receive light from said source,
   a movable fibre-optic section arranged for movement between axially-adjoining aligned and mis-aligned positions relative to said fixed fibre-optic sections,
   an actuating member connected to said movable fibre-optic section to effect motion thereof,
   light sensitive means aligned with said fixed fibre-optic sections for receiving light energy transmitted through said fixed and movable fibre-optic sections when they are aligned,
   a sealed housing containing said light source, said fibre-optic sections and said light receiving means, and having an opening therein, and said actuating member constituting a resilient member sealed at its periphery to said housing to close the opening therein.

2. Signal control apparatus according to claim 1 which comprises
   spring means normally urging said resilient member and said movable fibre-optic section to its non-aligned position.

3. Signal control apparatus according to claim 1 wherein
   said light receiving means constituted a photoelectric cell.

* * * * *